Patented July 15, 1952

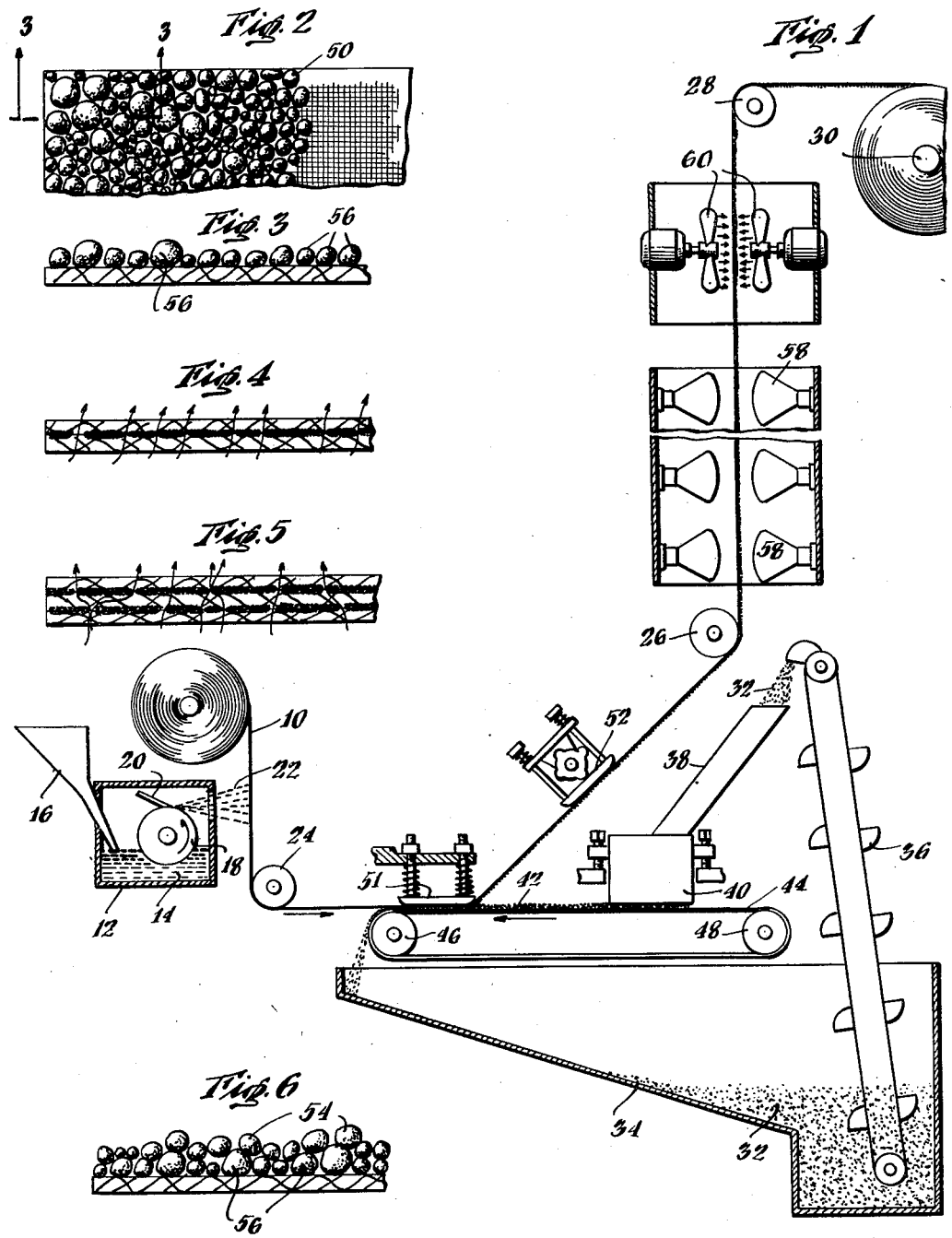

2,603,575

UNITED STATES PATENT OFFICE 2,603,575

METHOD OF MAKING A STIFFENED PERMEABLE RESIN COATED FIBROUS SHEET

August F. Schramm, Jr., White Plains, N. Y.

Application November 17, 1949, Serial No. 127,910

3 Claims. (Cl. 117—60)

This invention relates to a treated sheet and the method of making it.

The invention is particularly useful in connection with the treatment of textile fabrics and will be first illustrated by description in connection with the treatment of such fabrics.

The invention is an improvement over that described in my application for U. S. patent, Serial No. 664,789, filed April 25, 1946, for Method of Making Stiffened Permeable Sheet Material, issued November 29, 1949, as Patent No. 2,489,466. In this application, there is described a product and method of making it, in which product the particles of stiffening material penetrate the fabric at closely spaced positions and leave permeable spots between the positions of the particles of stiffening material.

The method and product of this earlier application are useful. A disadvantage arises when the treatment is applied to a dyed fabric or to one that has been made water repellent. The solvent there introduced has the property of disturbing the distribution of the dye and the added water repellent. Thus the addition of the dust of the plastic over the surface of the plasticizer-moistened fabric, warming, and pressing in the dust at spaced positions, as described in the earlier application, results in some instances in spotting of the color and also loss of water repellency of the previously treated fabric.

I have now discovered a method and product in which the loss of water repellency is prevented and spotting of one side or face of the fabric is prevented.

Briefly stated, my invention comprises moistening the permeable sheet with a volatile non-solvent for the plastic material to be applied as stiffener, applying the plastic material in the form of solid spaced particles, on the moistened sheet, anchoring the particles so applied, and evaporating the non-solvent liquid.

The result of this treatment is the penetration of the particles of plastic material into one side only and adjacent parts of the sheet directly below that side. Because the non-solvent acts as a barrier, the penetration does not extend all the way through the sheet. The face opposite that to which the plastic material is applied is not spotted or mottled in color. Neither is the water repellent material of the opposite face extracted and concentrated in the spaced particles of plastic material. The product remains permeable to perspiration, air and moisture and possesses what is usually referred to as breathing properties.

The plastic material applied to one side of the sheet as described may be used as the binder for laminating two or more sheets which are brought together with the treated face inside the assembly. In the lamination, the plastic binder is concentrated where it will do the most good, on the side being adhered to another layer of fabric.

The invention will be illustrated in greater detail in connection with the drawings to which reference is made.

Fig. 1 is a side view partly in section of apparatus for treating a sheet in accordance with the invention.

Fig. 2 is an enlarged plan view, partly broken away for clearness of illustration, of a finished treated fabric.

Fig. 3 is a sectional view on line 3—3 of Fig. 2.

Fig. 4 is a sectional view of a laminated product made in accordance with the invention.

Fig. 5 is a like view of another laminated product, and

Fig. 6 is a sectional view on an enlarged scale showing the condition of the sheet material before removal of those of the particles of applied plastic that are not in direct contact with the sheet.

There are shown the sheet material 10 to be treated, container 12 for water or like non-solvent material 14, filling funnel 16, pick-up roller 18, and doctor blade 20 for forming and directing a spray 22 against the sheet material 10. The sheet material passes over guide rollers 24, 26 and 28 and is finally rolled up on the reel 30.

The particles of plastic material 32 which are to be applied to the sheet material are maintained in a suitable container 34 with conveyor 36 delivering material from the container to charging chute 38 and then to the spreading box 40 from which a layer 42 of the plastic material is spread upon the conveyor 44.

This conveyor passes over the rollers 46 and 48 one of which is driven by conventional drive means that are not shown. The direction of the reach of the conveyor carrying the plastic material is counter to the direction of movement of the sheet material 10. The sheet material to be treated, in moving counter to the direction of the conveyor 44, passes under the pressure member 51 which holds the sheet material under light pressure against the layer 42 of plastic material, so that the plastic material is rubbed onto the cloth.

A conventional type of vibrator 52 contacts the untreated side or top of the cloth as the cloth leaves the pressure member 51 and passes upwardly in inclined or vertical direction. This vibrator 52 causes such tapping on the back of the treated sheet material that those of the particles 54 not in direct contact with the cloth (Fig. 6) are caused to fall away. This vibrating leaves on the previously moistened sheet material only the particles 56 which are in direct contact with the cloth and which remain in the structure shown in Figs. 2 and 3.

After passing under the vibrator for removal of the non-tacky plastic material, the cloth with the adhered layer of plastic particles passes through a bank of infrared lamps 58 serving as a heater and then through a cooling chamber such as one containing the spaced blowers 60.

The cloth so processed is ready for use, as in making shoes.

In one use, the treated cloth is laminated with another sheet or other sheets, to make plied products such as illustrated in Figs. 4 and 5. Here the plastic material is on the inside. It serves as a binder to hold the sheets together after they have been hot-rolled or ironed and then allowed to cool.

These plied products are permeable, as shown for instance by the arrows of Figs. 4 and 5.

The operation of the apparatus will be largely evident from the description of it that has been given. In brief, the particles of solid material are applied by moving a layer of them counter to the direction of movement of and against the sheet material to be treated. The sheet material at this time is pressed by slight pressure against the upper surface of the layer, so that there is rubbing of the particles onto one side of the sheet. Then as the sheet is separated from the remaining mass of particles and preferably moved upwardly, the sheet is tapped slightly upon the side opposite the adhered particles. As a result particles that are not in direct contact with the sheet fall from the sheet. The result is a mosaic of spaced particles or islands of the dust of plastic material.

This sheet with the applied spaced particles of plastic is then subjected to treatment to anchor the particles in position on one side of the sheet. The warming causes evaporation of the volatile non-solvent material originally used and also softening of the particles of thermoplastic to the stage at which they are drawn into the sheet by capillarity as the content of volatile non-solvent is reduced. The particles, however, do not come to extend completely through the sheet. This anchoring of the particles to the sheet may be accelerated by the application of pressure by conventional ironing or rolling means, that is, calendering (not shown), to the warmed sheet during the evaporation of the solvent.

During the application of the plastic dust to the lower side of the sheet fabric as shown in the drawing, the other side is protected to advantage from settling of dust upon it, as by an overriding belt of usual kind (not shown).

The original moistening of the sheet material to be treated is effected by any convenient means and with conventional equipment such as passing the sheet through a bath of the selected solvent and subsequent squeezing out of the excess between rollers, this equipment being conventional. I use to advantage spray equipment to apply the non-solvent to the sheet. The proportion of water or other non-solvent at the time the dust is applied is somewhat less than the saturation proportion. The proportion of non-solvent applied must be adequate to wet all the fibers on the side of the sheet to be treated. As a result, there are no dry spots into which the plastic material as applied may penetrate without restriction.

The heating of the sheet material and applied plastic dust is effected to advantage in a usual type of infrared heating equipment. The time of 15 sec. to 1 min. or so in the hot zone is adequate to effect the drying. The non-solvent evaporates evenly and non-violently. A temperature near the sheet material of approximately 200° to 350° F. is satisfactory. I have used to advantage a temperature of about 300° and a time of heating in the infrared heating zone of 15 sec.

While a textile fabric such as one of cotton, wool, rayon or nylon is preferred as the base material, I may use other fibrous sheet material as, for instance, paper, cardboard, or thin felt.

As the plastic there is used one which is stable, solid at ordinary temperatures, and subject to hardening after impregnation into the surface portions of the sheet material. When the anchoring of the plastic within the sheet material is to be effected by warming and subsequent cooling from the heat-softened condition, the plastic should be one that is thermoplastic. When the non-solvent used is water, the plastic should be water insoluble both before and after compounding with the plasticizer. Examples of plastics that may be used are a vinyl chloride resin such as the copolymer of vinyl chloride and vinyl acetate in the proportion of about 95 parts of the former to 5 of the latter, polyvinylbutyral, cellulose acetate, and methyl methacrylate.

The plastic material selected is suitably plasticized with one of the known commercial plasticizers for the particular plastic selected. The plasticizer should be non-toxic under conditions of use and preferably also non-flammable. Examples of such plasticizers that may be used are tributyoxyethyl phosphate, dimethoxyethyl phthalate, an alkyl aryl phosphate such as butylcresyl phosphate or Santicizer 141, and tricresyl phosphate. When the plastic material used is cellulose acetate, I prefer to use the dimethoxyethyl phthalate.

In place of water, there may be used, as the non-solvent, cleaner's naphtha, toluol, alcohol, or the like. Known solubilities of the plasticized material will control the selection of the non-solvent, to ensure the desired non-solvent properties.

As to proportions, the plasticizer is used in the amount of about 25 to 125 parts for 100 parts of the plastic of the kind described. The amount of plasticizer used must be adequate to give softening of the plastic material when warmed to about 200° F. but must be below the amount which, if used, would cause the solid particles of plastic material to coalesce in contact with each other at normal temperatures. The proportion of the plastic material is such that the plasticized particles or plastic material will flow over themselves, as during the application by rubbing onto the sheet material in the manner described above. In other words, the particles of the plastic material are free flowing and non-coherent; the combination of the plastic and the plasticizer being herein referred to for convenience as plastic material.

In the finished product it is considered that the closely spaced masses of plastic material cover about ¼ to ¾ of the area on the one side of the sheet material. The masses contact at certain points to give a skeletonized structure.

The invention will be further illustrated by detailed description in connection with the following specific examples.

Example 1

Woven cotton fabric such as used in canvas shoes, is passed through the zone of a water spray. The thus moistened sheet is then passed over the top of a layer of particles of plastic material of fineness about 20 to 200 mesh, the particles being moved in direction opposite to that of motion of the fabric. After the two surfaces have been rubbed together over a distance of a foot or so, the fabric with particles of the plastic dust adhering to one side is then drawn upwardly in inclined position, with the particle-coated side down. During this drawing of the fabric, the fabric is tapped lightly on the back (upper side) to cause dislodgment of particles of the plastic dust other than those that are in direct contact with the moistened cloth. When this has been done, then the cloth with remaining particles of the dust still adhering to the cloth is passed through an infrared heating zone. This softens the plastic material. The softened material sinks into the surface portions of the cloth without passing completely through the cloth. During this heating operation, the moisture in the cloth is evaporated.

The plastic material used in this example is the polyvinylchloracetate plastic VYNW containing 80 parts of the tributoxyethyl phosphate as plasticizer for 100 parts of the polyvinyl resin. Such a product is made by spray drying a solution of the plastic and atomizing plasticizer against the resulting solid particles while they are still suspended in the drying chamber.

Example 2

The procedure of Example 1 is repeated except that, in place of the phosphate plasticizer there described, there is used an equal weight of the Santicizer 141.

Example 3

The procedure of Example 1 is followed except that, in place of the phosphate there described, there is used an equal weight of tricresyl phosphate and, in another preparation, an equal weight of dimethoxyethyl phthalate.

Example 4

The treated sheet materials made as described in Examples 1–3 is subjected to a hot ironing operation. The applied particles of dust are thus anchored more deeply in the fabric by pressure applied to them at the time they are in heat-softened condition.

Example 5

A treated fabric made as described in Examples 1–3 is composited with another sheet of fabric, the plastic material applied as described being placed on the inside of the assembly and the whole being then pressed together at a temperature equal to the softening point of the plastic material, as at 200° to 250° F.

Example 6

The procedure of Examples 1–4 was followed except that the fabric was replaced by a rather thick paper of sulfite pulp and, in another run, by thin felt.

Products made as described still retain their penetrability to moisture and air. A drop of water placed on one side of the thus treated fabric passes through at once to the other side. Also smoke can be blown through the sheet. The application of the dust to one side of the sheet does not affect the appearance of the other side but does give to the whole sheet the desired stiffening effect.

The particles of plastic material that are used may contain conventional ingredients. Thus, they may contain stabilizers, inert fillers, or coloring substances.

The particles of plastic material may be applied to both faces of the sheet material. For this purpose the same treatment is given to the second face that has been applied as described to the first face. Sheets that have been treated on both faces are particularly useful as the laminating sheet in plying together two other sheets, as in the making of a collar stock.

When the plastic material is given the desired color as by the incorporation of pigments or dyes, then the effect on the treated face may be one that is desirable in appearance for certain uses. In other words, my method and product provide a fabric or like sheet material with a new form of appearance of surface.

Also, the face of the sheet material that has been treated as described may be subjected to conventional embossing operations. In these operations the plastic material comes to be embossed in pattern desired.

The omission of pretreatment of the sheet material with organic solvent for the plastic used is a matter of great economy in the operation. It is also advantageous in the reduced penetration which is obtained in the absence of the organic solvent. As a result the treated sheet material, when a fabric, retains a large proportion of its permeability and breathing properties although the percentage of open meshes or spaces in the over-all product is reduced from that which characterized the original sheet material. This retention of a part only of the permeability is desirable in certain uses, as, for instance, in shoe stock, where the original free permeability to water is objectionable.

When it is desired to increase the proportion of plastic material applied or to increase the thickness of the spaced islands of the plastic material in the finished product, the treatment described may be repeated. In this way the particles come to build up one on another.

Also the particles applied as described may be somewhat elongated, as in the form of flock of thermoplastic material. When this is the condition, then a pile-type of finish is obtained on the fabric.

It will be understood also that it is intended to cover all changes and modifications of the examples of the invention herein chosen for the purpose of illustration which do not constitute departures from the spirit and scope of the invention.

What I claim is:

1. In making a sheet that contains applied plastic and is permeable to air and moisture, the method which comprises moistening with water a permeable fibrous sheet provided with fine pore spaces and being non-softening and non-deteriorating at the softening temperature for the said plastic, applying over the moistened sheet a layer of non-coherent free flowing solid particles of a water insoluble organic thermoplastic material and of size about 20 to 200 mesh, removing the applied material except for a single layer of spaced particles thereof directly in contact with the moistened sheet, and then warming the thus treated sheet to a temperature of at least 200° F., to cause evaporation of water, and continuing the warming until the thermoplastic material is softened, to cause adherence thereof within the surface portion of the sheet, the water in the moistened sheet as used decreasing the penetration of the plastic material on the sheet.

2. The method of claim 1, in which calender pressure is applied during the step of warming the treated sheet.

3. The method of claim 1 in which the said applying of the particles to the moistened sheet is effected by contacting a loose layer of the said particles with the lower face of the moistened sheet, causing movement of the layer of particles in one direction and of the sheet in the opposite direction, and maintaining contact of the particles and sheet during the said movement, so that the particles are rubbed against the lower face of the moistened sheet.

AUGUST F. SCHRAMM, Jr.

REFERENCES CITED

The following references are of record in the file of this patent:

UNITED STATES PATENTS

| Number | Name | Date |
| --- | --- | --- |
| 670,393 | Arkell | Mar. 19, 1901 |
| 1,277,695 | Cavanaugh | Sept. 3, 1918 |
| 2,035,766 | Schramm | Mar. 31, 1936 |
| 2,050,239 | Albright | Aug. 11, 1936 |
| 2,060,665 | Durant | Nov. 10, 1936 |
| 2,130,530 | Fletcher | Sept. 20, 1938 |
| 2,199,597 | Renfrew | May 7, 1940 |
| 2,291,616 | Fletcher | Aug. 4, 1942 |
| 2,317,779 | Jansen | Apr. 27, 1943 |
| 2,371,618 | Hanson | Mar. 20, 1945 |
| 2,477,336 | Jennings | July 26, 1949 |
| 2,489,466 | Schramm | Nov. 29, 1949 |